July 18, 1933. J. M. BRILL ET AL 1,918,685
GASKET FOR TRAIN PIPE CONDUITS
Original Filed May 4, 1931

Inventors
Martin A. Barber,
Joseph M. Brill,
By Bates, Goldrick & Teare
Attorney Patented July 18, 1933

1,918,685

UNITED STATES PATENT OFFICE

JOSEPH M. BRILL AND MARTIN A. BARBER, OF CLEVELAND, OHIO, ASSIGNORS TO CONSOLIDATED CONNECTOR PATENT CORPORATION, OF CLEVELAND, OHIO, A CORPORATION OF DELAWARE

GASKET FOR TRAIN PIPE CONDUITS

Application filed May 4, 1931, Serial No. 534,793. Renewed November 21, 1932.

This invention relates to gaskets that are used in train pipe couplers, and particularly to those that are adapted for use in automatic train pipe connectors. Heretofore, gaskets for such purpose have been made of rubber, as it was found necessary and desirable to have a yielding surface for insuring a tight connection when the cars are coupled. Rubber however, has a tendency to harden especially in the steam conduit, where it is subjected to intense heat, and thereby to leak after it has been in use for a relatively short period of time. A further objection to the use of rubber is the fact that fluid under pressure works in behind the gasket and frequently blows it when the couplers or heads are disconnected.

An object of the present invention is to provide a gasket which has the desirable yieldable feature, and yet is not apt to be blown out upon disengagement of the conduits. In addition, our invention contemplates the provision of a gasket, which will wear longer than any heretofore used for like purposes, and which can be readily and quickly installed within the fluid conduits.

Figure 1:
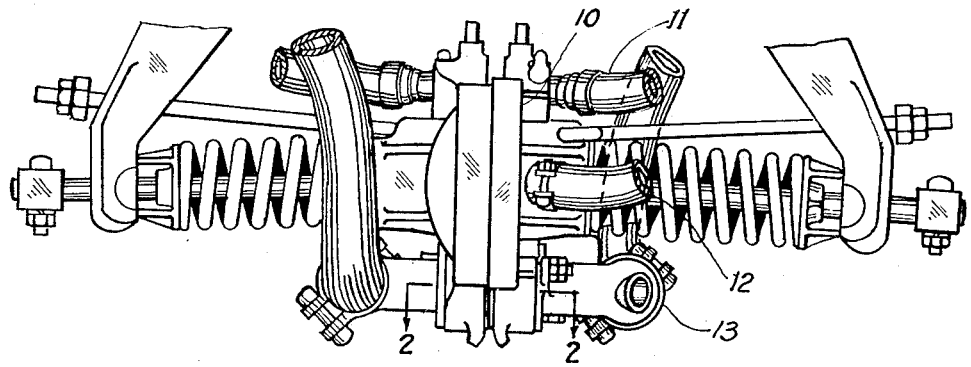
Figure 2:
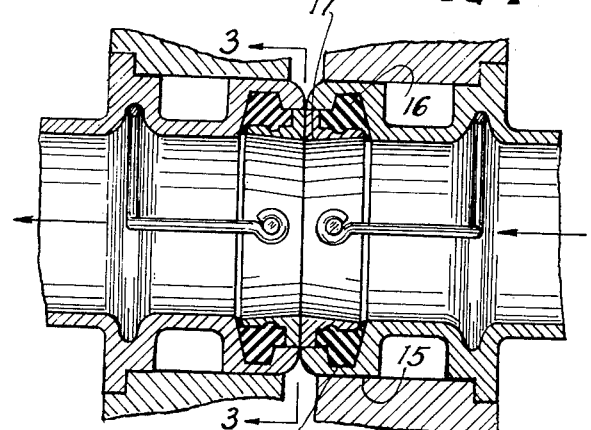
Figure 3:
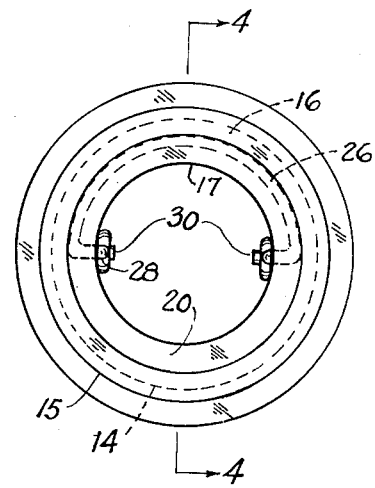
Figure 4:
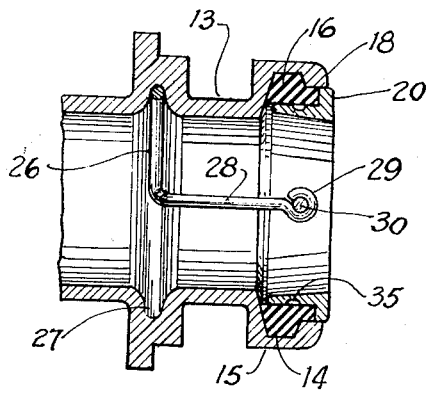

Referring now to the drawing, Fig. 1 is a side elevation of a pair of automatic train pipe connectors embodying our invention; Fig. 2 is a section taken on the line 2—2 in Fig. 1; Fig. 3 is an end view of one of the conduits taken on the line 3—3 in Fig. 2, and Fig. 4 is a section taken on the line 4—4 in Fig. 3.

Our invention is shown in connection with a fluid conduit that is associated with an automatic train pipe connector. To this end, the connector is illustrated, as comprising a head 10, which has provision for receiving the ends of train pipe conduits 11, 12 and 13 respectively. In Fig. 2, we have shown a section through a pair of conduits adjacent the region of engagement, and as shown therein, the end of each conduit has an enlarged portion 15, within which the gasket is arranged to be disposed.

The gasket embodying our invention preferably embodies an inner member 16 and an outer member 17 as is shown particularly in Figs. 2 and 3. The inner member is preferably made of resilient material, such as rubber, while the outer member is preferably made of metal. The outer member projects slightly beyond the outer face 18 of the conduit 13 so that the yieldable member is placed under compression when the heads are connected. In addition the outer member is substantially cylindrical in form and has a flange 20 that provides a contact face. The back wall of the flange therefor and the outer surface of the cylindrical portion, bear against the inner member 16 and cooperate with the conduit to enclose the rubber and to hold it securely in place. The outer member in turn may be held in position by a detachable mechanical connection with the conduit.

The preferred form of connection between the gasket and conduit comprises a strip of spring wire that is bent intermediately, in the form of a semicircle 26, and that is adapted to lie within an annular groove 27 in the conduit and back of the gasket. The portions of the wire at the ends of the semicircular portion extend forwardly, as at 28, adjacent the wall of the conduit, and are provided at the ends thereof with eyes 29. Such eyes are adapted to extend over projections 30, which in turn extend radially and inwardly from the outer gasket member.

To assemble the gasket, the inner member 16 is positioned within the groove 14 within the conduit and then the wire keeper is bent slightly until it is sufficiently small to pass through the conduit, and to enter the groove 27. When pressure thereon is released, it expands into the groove and fits snugly therein. The outer member of the gasket is then inserted within the end of the conduit and the arms 28 of the keeper are bent inwardly sufficiently to enable the eyes 29 to fit over the projections 30. When the pressure on the arms is released, the eyes snap over the projections. Thereafter, the spring tension in the wire holds the eyes securely in place.

When the gasket is in use, the pressure incident to the engagement of the coacting conduits will compress the inner member. To utilize such pressure, as an additional means for holding the gasket in place, we prefer to provide an annular groove 35 on the cylindrical portion of the outer member, as is shown in Fig. 4. The rubber on the inner member will then fill the groove when the conduits are connected, as is illustrated in Fig. 2. The heat incident to the passage of steam through the steam conduit will have a tendency to set the rubber within the groove, thus making a firm connection between the inner and outer members.

An advantage of my invention is the fact that the part of the gasket that is subjected to wear is made of metal and is therefore not readily susceptible to damage by proper engagement with a coacting head. A further advantage is the fact that the gasket may be held securely in position and not be easily susceptible to being blown out when the heads are disconnected under pressure.

We claim:—

1. In combination, a train pipe fluid conduit, a gasket therefor, said gasket comprising an outer metallic member and an inner resilient member, the outer member cooperating with the conduit to completely enclose the inner member, said conduit having an annular groove in back of the gasket, a flexible member having a semi-circular intermediate portion lying within the groove, and having end portions extending forwardly, and operatively connected to the outer member for holding said members in position with reference to the conduit.

2. In combination, a train pipe fluid conduit having a cylindrical outer portion, and a reentrant annular portion adjacent thereto, a yieldable gasket within the reentrant portion and occupying part of the cylindrical portion, a metallic collar for the gasket, said collar having a flange occupying the remainder of said cylindrical portion, said flange projecting normally beyond the end of the cylindrical portion but adapted to be moved inwardly when coupled to a coacting conduit.

3. In combination, a train pipe fluid conduit having a cylindrical outer portion and an annular reentrant portion adjacent thereto, a yieldable gasket occupying the reentrant portion, a metallic gasket bearing against the yieldable gasket and having a portion thereof disposed within the cylindrical portion, whereby the yieldable gasket is entirely concealed, the metallic gasket having opposed inwardly extending projections, the conduit having an annular groove in back of the reentrant portion, and a yieldable retaining member positioned within said groove and having portions thereof looped around said projections for holding the metallic gasket in operative position with reference to the conduit.

JOSEPH M. BRILL.
MARTIN A. BARBER.